July 5, 1949.　　　　　F. M. ALVAU　　　　　2,475,467
ANIMAL TRAP
Filed Aug. 23, 1947　　　　　　　　　　　　3 Sheets-Sheet 1
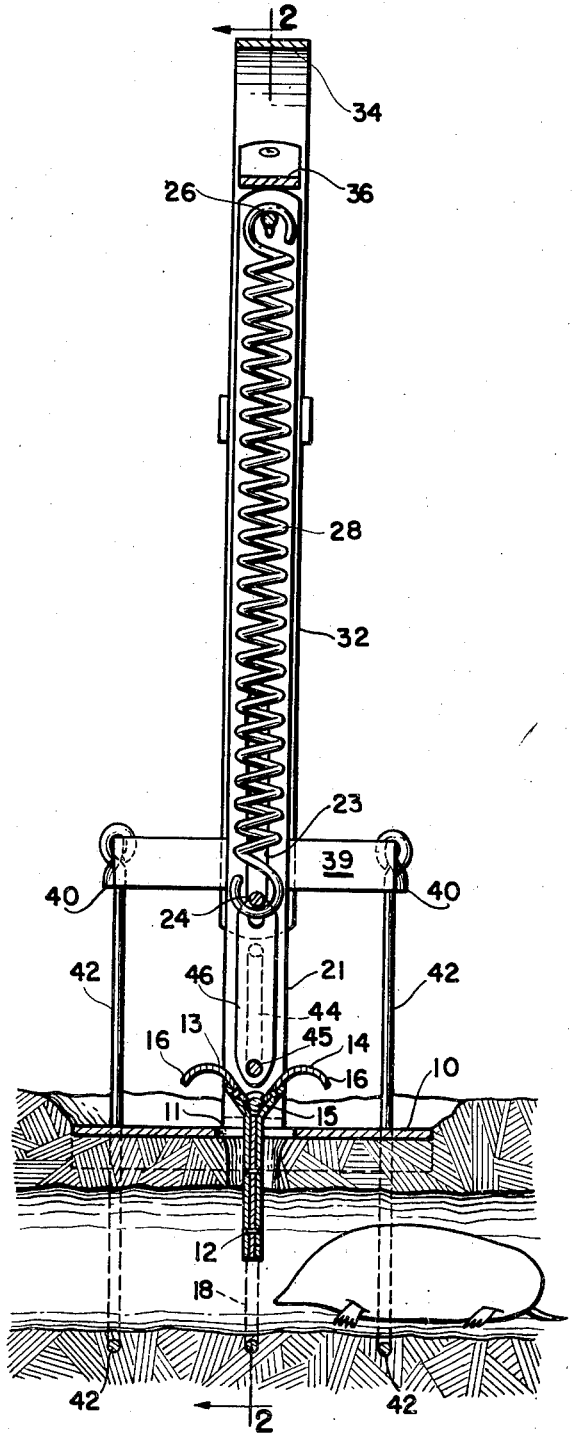
FIG_1
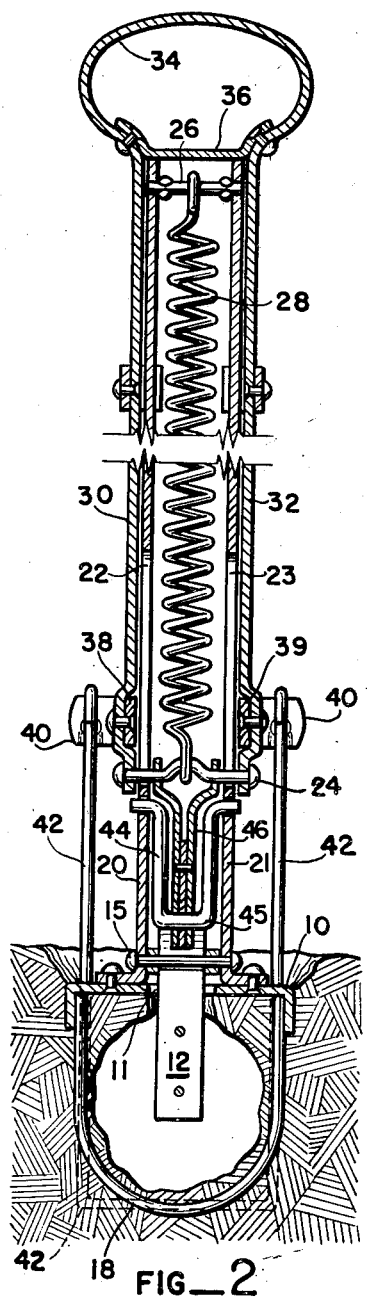
FIG_2
Inventor
FRANK M. ALVAU
Smith & Tuck
Attorney

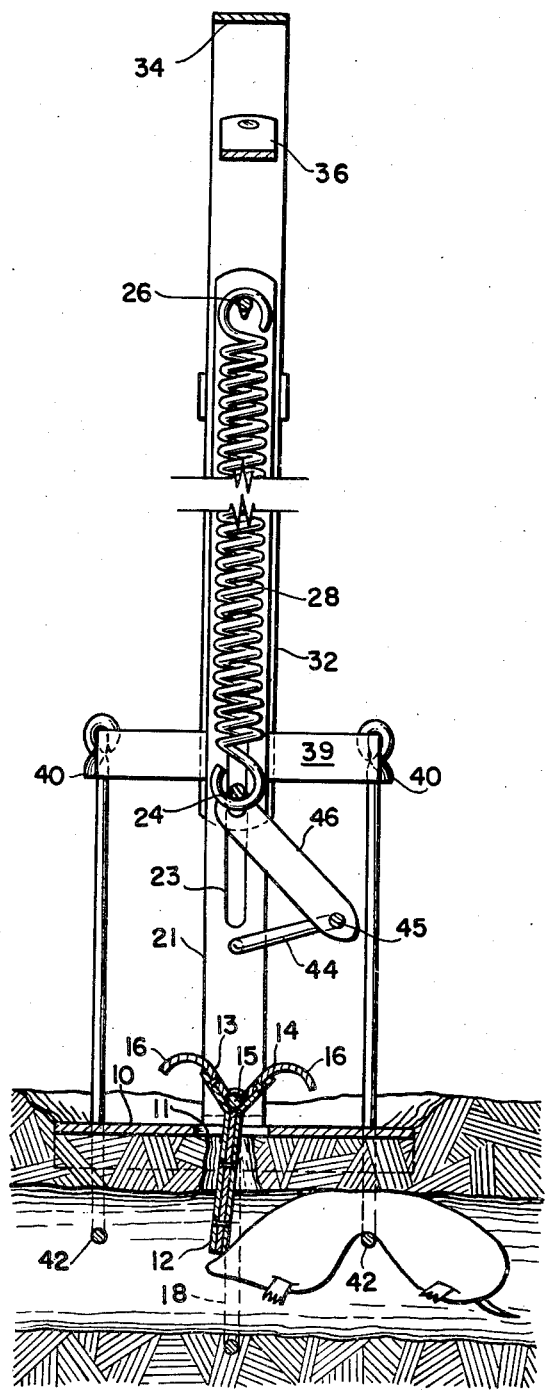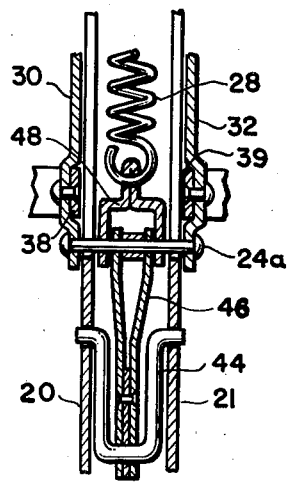

July 5, 1949.  F. M. ALVAU  2,475,467
ANIMAL TRAP
Filed Aug. 23, 1947  3 Sheets-Sheet 3
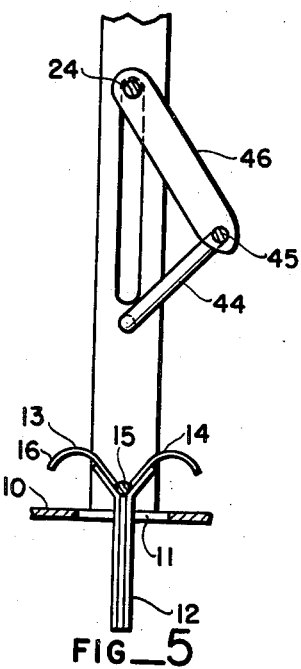
FIG_5
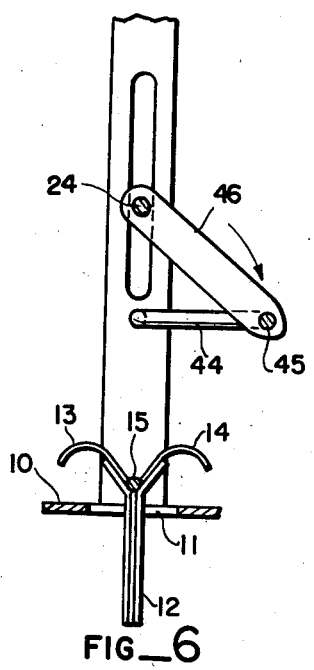
FIG_6
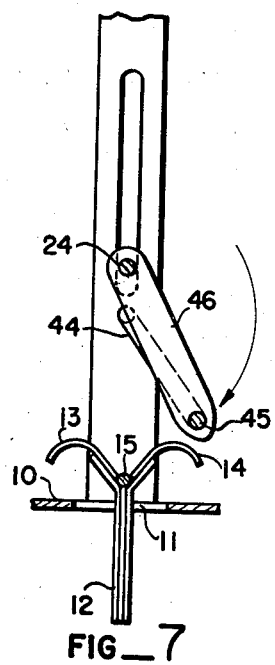
FIG_7
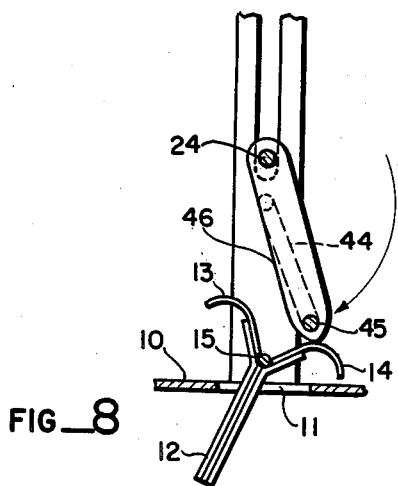
FIG_8
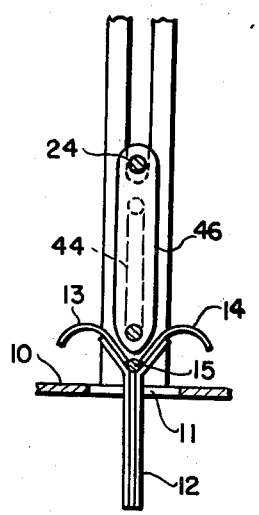
FIG_9
FRANK M. ALVAU
Inventor
By Smith & Tuck
Attorneys Patented July 5, 1949

2,475,467

UNITED STATES PATENT OFFICE 2,475,467

ANIMAL TRAP

Frank M. Alvau, Maryhill, Wash.

Application August 23, 1947, Serial No. 770,291

3 Claims. (Cl. 43—78)

This invention relates to animal traps and, more particularly, to a trapping device for rodents or burrowing animals that tend to follow pathways or runways in the course of their activities.

My invention is primarily an improvement in the device shown in my United States Patent Number 1,918,582 issued July 18, 1933, upon Animal traps.

Among the animals which this trap is particularly designed to ensnare are moles, rats, mice, gophers, and the like, which commonly inhabit subterranean passageways that usually lie but a short distance below the surface of the ground or restricted paths in buildings, and the like. My trap is designed to be "set" at a point other than the point of use, and then to be placed in an operative position with respect to a runway, so that a trigger element is positioned in the path of the animal so that as it travels through the passageway, it can trip the trigger and will be captured by a trapping loop, irrespective of which direction he approaches the trap in the runway.

In my trap described in the patent referred to above, it was found that the setting operation was particularly difficult to effect and required using both hands on the part of the operator. Such was due to the fact that pressure had to be applied to a sliding frame to depress the same with respect to the rigid or main frame, in order to bring the trapping loops into the "set" position and the other hand had to be used to manipulate the toggle link into a medial position with respect to the trigger mechanism, so that the ensnaring or trapping loop would be held in the "set" position. In the former device I provided the toggle member with an elongated hole or opening, through which was fitted very loosely a pivot pin that moved with the sliding frame. This resulted in a sloppiness in the action of the toggle link while it was being set that required manual centering of the toggle link. In addition, the trigger mechanism had a relatively small straight-sided centering V in which the end of the toggle link was positioned when the trap was "set." Because of the smallness of this V it was necessary to manually tip the trigger mechanism in order to position the V thereof to receive the end of the toggle link. Such was found to be quite undesirable, because it is usually abhorrent to the normal individual to place his fingers in proximity to the jaws of a trap while setting it, because of the usual fear that the setting mechanism may fail and accidentally the user would have a finger caught in the trapping loop or other parts of the mechanism.

This present invention is so designed and the mechanism is so arranged that it may be set by the use of but one hand in applying pressure to the sliding member to swing the toggle element into position in the V of the trigger member and without necessitating manual assistance from the other hand and, further, without bringing the fingers of the other hand close to the snaring elements of the trap.

It therefore becomes apparent that it is a prime object of the present invention to provide an animal trap which may be set by the use of but one hand.

Another object of the invention is the production of an animal trap which is extremely simple to construct and operate.

Still a further object of the invention resides in the provision of an animal trap which is very sensitive when "set" and yet can be placed in the pathway of an animal that is sought to be captured without accidentally springing the same.

Other and more specific objects of the invention will be apparent from the following description taken in connection with the accompanying drawings, wherein:

Figure 1 is a vertical sectional view from the side showing my improved trap in position in a mole passageway and "set."

Figure 2 is a vertical sectional view of the trap of Figure 1 taken on the line 2—2 thereof;

Figure 3 is a vertical sectional view similar to Figure 1 showing the trap in the sprung position;

Figure 4 is a fragmentary vertical sectional view showing a modified form of attaching the biasing spring to the accurately guided pivot means of the toggle link; and Figures 5, 6, 7, 8, and 9 are fragmentary views of the mechanism of the toggle mechanism showing the progressive positions assumed thereby during setting of a trap.

Turning now to the drawings, throughout which like reference characters indicate like parts, the numeral 10 designates an inverted U-shaped sheet metal base plate having a medial slot 11 in which is positioned the trigger element that is generally Y-shaped and includes the depending tongue 12 and arms 13 and 14 diverging from each other on either side of the pivot pin 15 to which the trigger element is secured. Each of the arms 13 and 14 have convex wing elements 16 as shown in Figures 1 and 3 and elsewhere throughout the drawings.

In a preferred form of my invention I employ, rigidly secured to the base plate 10, a setting loop 18 which is formed of wire and extends from side to side of the plate in a manner that generally encircles the tongue 12 of the trigger mechanism.

Rising above the base plate 10 on each side of the trigger mechanism are rigid upright frame members 20 and 21 which are spaced apart to form a channel and each of which has a slot 22 and 23 respectively to receive and guide the pivot pin 24. At their upper ends members 20 and 21 are spaced apart and secured together by the double headed rivet 26. A tension spring 28, here shown to be of the usual helically coiled type, is mounted between pivot pins 24 and 26. When the spring is free to act the tendency is to draw the pin 24 toward pin 26 into the upper limits of the slots 22 and 23. Pin 15 is mounted in the lower ends of members 20 and 21 to rotate.

A slide frame is mounted upon the upright members 20 and 21, externally thereof, and comprises bars 30 and 32 which have formed between their upper ends the handle element 34 and are spaced apart by the cross members 36 and are joined at their lower ends by the pivot pin 24.

Near the lower end of the members 30 and 32 are cross bars 38 and 39 which have terminal ears 40 outstanding therefrom. Between opposed pairs of ears 40 I provide a trapping or ensnaring loop 42 which is formed of wire having an eye, engaging a suitable opening in an ear 40 the sheet metal of the ear being bulged outwardly to accommodate a wire 42 which lies in the same vertical plane as the ear 40. The wire 42 passes through the opening, over the top of the ear 40, and is then bent downwardly almost into contact with itself, thus forming an eye. From such eye, the wire passes downward through a suitable opening in the plate 10 then across beneath plate 10 and upward in similar manner on the opposite side of plate 10 to where it joins to an oppositely disposed ear 40 of the opposite cross bar. When the loops 42 are down, as may be seen in Figure 1, the trap is "set" and when the loops are up they are arranged relative to the base plate 10 in the snaring or trapping position.

The sliding frame is held in the down or "set" position by a toggle member carried on pin 24. A crank 44, pivoted to members 20, 21 coacts with toggle link 46. The toggle mechanism comprises a bifurcated link 46, the arms of which are closely and accurately coupled, in a pivotal manner, to cross pin 24 on either side of the point of joinder of the spring 28 therewith. The U-shaped crank 44 is journalled at either end in the members 20 and 21 and has its crank pin 45 pivotally connected near the end of toggle link 46.

In Figure 4 I have shown a slightly modified manner of attaching the spring 28 to pivot pin 24a by the use, between these two elements, of a forked, generally inverted Y-shaped, clip 48, the arms of which are pivotally coupled to pin 24a, and the leg of which receives the hooked end of spring 28.

The operation of setting the trap comprises depressing the sliding frame and the trapping loop 42 with respect to the base plate 10 so that loops 42 are substantially aligned with loop 18 to provide a passageway obstructed only by the depending tongue 12 of the trigger element. In setting the trap, pressure is applied by the handle 34 to cause the pivot pin 24 to move downward in slots 22 and 23. This causes the toggle link 46 to swing on the crank pin 45 in a path determined by the length of the arms of crank 44 in the manner suggested in Figures 5, 6, 7, 8, and 9. The final or "set" position probably is best shown in Figure 1.

By insuring that the toggle link is accurately and closely coupled with pivot pin 24, so that no lost or lateral movement can obtain, I insure that the upper end of the toggle link travels in a straight line so that the link does not wobble in any manner. Thus, as the link moves downward with the upper end held in a uniformly straight path of travel, and when its outer end, or that coupled to the crank pin 45, comes directly under the pin 24, the toggle link is centered and will remain so, unless tripped. In effect, the toggle link is in low dead center. By providing the trigger mechanism with a convex wing 16, one on each side, it is possible for the end of the toggle to be positioned in the V of the trigger mechanism without manual manipulation, since the link end strikes against the curve of the wings and deflects the trigger mechanism slightly out of its normal upright position. This permits the tip end of the toggle link to be disposed in the V of the trigger mechanism which latter assumes, under those conditions, a symmetrical disposition on each side of the toggle link.

With the trap set, as has just been described, the operator may insert the trap into the ground by forcing the wire trapping loops 42 and the setting loop 18 through the ground surface a sufficient depth to insure an unobstructed pathway. The setting loop 18 facilitates the entry of the tongue 12 of the trigger mechanism into the runway.

The function of the setting loop is to provide a rigid mounting for the base 10 when pressure is being applied to the handle 34 to force loop 42 downward. Under certain circumstances the loop 18 may be dispensed with, in which case the operator would support the outer ends of the plate 10 upon a suitable base and above the ground so that he could force the loop 42 downward.

It should be apparent that when the trap is set, as it is shown in Figure 1, it may be sprung by animals approaching it in either direction since the trigger tongue can reciprocally swing on either side of dead center and, in doing so, one or the other of the arms 13, and 14 will dislodge the toggle link from the low dead center position and permit the spring to come into effect and rapidly draw upward the trapping loop 42. Commonly the belly of the animal thus springing the trap will be positioned in one of these loops and the animal will be captured in the manner shown in Figure 3.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A rodent trap for subterranean animals comprising: a medially slotted base plate having a rigid upright main frame supported thereby and including a setting loop under the main frame, a trigger member having a lower tongue and an upper V-shaped jaw, said trigger member being pivotally mounted in said medial slot of the base plate so that the tongue is disposed below said base plate in the setting-loop and the V-shaped portion is disposed above said base plate, the V-shaped jaw portion of said trigger member including convex wing-elements extending to each side of the V of said jaw a substantial degree, a secondary frame slidably mounted on said main frame and including a pair of trapping loops movable therewith and guidedly associated with the base plate, each trapping loop being adjacent a face of the setting loop in a manner to provide a pathway when the trap is "set" through all of said loops, a toggle link, means carried by said sliding frame and cooperable with said main frame and connected with said toggle link to provide an accurately guided pivot for said toggle link, a spring between said main frame and said sliding frame, and a crank journalled in said main frame and pivotally coupled to said toggle link, said trap being capable of being "set" by the application of pressure to the sliding frame when the main frame is supported by the setting loop resting upon a firm base, whereby the end of the toggle link will swing outward and downward, then inward into tilting contact with a convex wing portion of said V-shaped jaw and, when the trigger tongue is substantially vertical to permit the end of the toggle link to assume a mid-position in said frame and in said V-shaped jaw and to be cocked in alignment with the crank against the urgence of said spring.

2. A rodent trap for subterranean animals comprising: a medially slotted base plate having a rigid upright main frame supported thereby and including a setting loop under the main frame, a trigger member having a lower tongue and an upper V-shaped jaw, said trigger member being pivotally mounted in said medial slot of the base plate so that the tongue is disposed below said base plate in the setting-loop and the V-shaped portion is disposed above said base plate, the V-shaped jaw portion of said trigger member including convex wing-elements extending to each side of the V of said jaw a substantial degree, a secondary frame slidably mounted on said main frame and including a pair of trapping loops movable therewith and guidedly associated with the base plate, each trapping loop being adjacent a face of the setting loop in a manner to provide a pathway when the trap is "set" through all of said loops, a toggle link, a pivot pin carried by said sliding frame and slidably cooperable with said main frame, said pivot pin being closely connected with said toggle link to provide an accurate pivot for said toggle link, a spring between said main frame and said sliding frame, and a crank journalled in said main frame and pivotally coupled to said toggle link, said trap being capable of being "set" by the application of pressure to the sliding frame when the main frame is supported by the setting loop resting upon a firm base, whereby the end of the toggle link will swing outward and downward, then inward into tilting contact with a convex wing portion of said V-shaped jaw and, when the trigger tongue is substantially vertical to permit the end of the toggle link to assume a mid-position in said frame and to be cocked in alignment with the crank against the urgence of said spring.

3. A rodent trap for subterranean animals comprising: a medially slotted base plate having a rigid upright main frame supported thereby, a trigger member having a lower tongue and an upper V-shaped jaw, said trigger member being pivotally mounted in said medial slot of the base plate so that the tongue is disposed below said base plate and the V-shaped portion is disposed above said base plate, the V-shaped jaw portion of said trigger member including convex wing-elements extending to each side of the V of said jaw a substantial degree, a secondary frame slidably mounted on said main frame and including a pair of trapping loops movable therewith and guidedly associated with the base plate, each trapping loop being adjacent a face of the trigger member in a manner to provide a pathway when the trap is "set" through said loops, a toggle link, means carried by said sliding frame and cooperable with said main frame and connected with said toggle link to provide an accurately guided pivot for said toggle link, a spring between said main frame and said sliding frame, and a crank journalled in said main frame and pivotally coupled to said toggle link, said trap being capable of being "set" by the application of pressure to the sliding frame when the main frame is supported by resting upon a firm base, whereby the end of the toggle link will swing outward and downward, then inward into tilting contact with a convex wing portion of said V-shaped jaw and, when the trigger tongue is substantially vertical to permit the end of the toggle link to assume a mid-position in said frame and in said V-shaped jaw and to be cocked in alignment with the crank against the urgence of said spring.

FRANK M. ALVAU.

REFERENCES CITED

The following references are of record in the file of this patent:

UNITED STATES PATENTS

| Number | Name | Date |
|---|---|---|
| 1,918,552 | Alvau | July 18, 1933 |